United States Patent Office 2,764,524
Patented Sept. 25, 1956

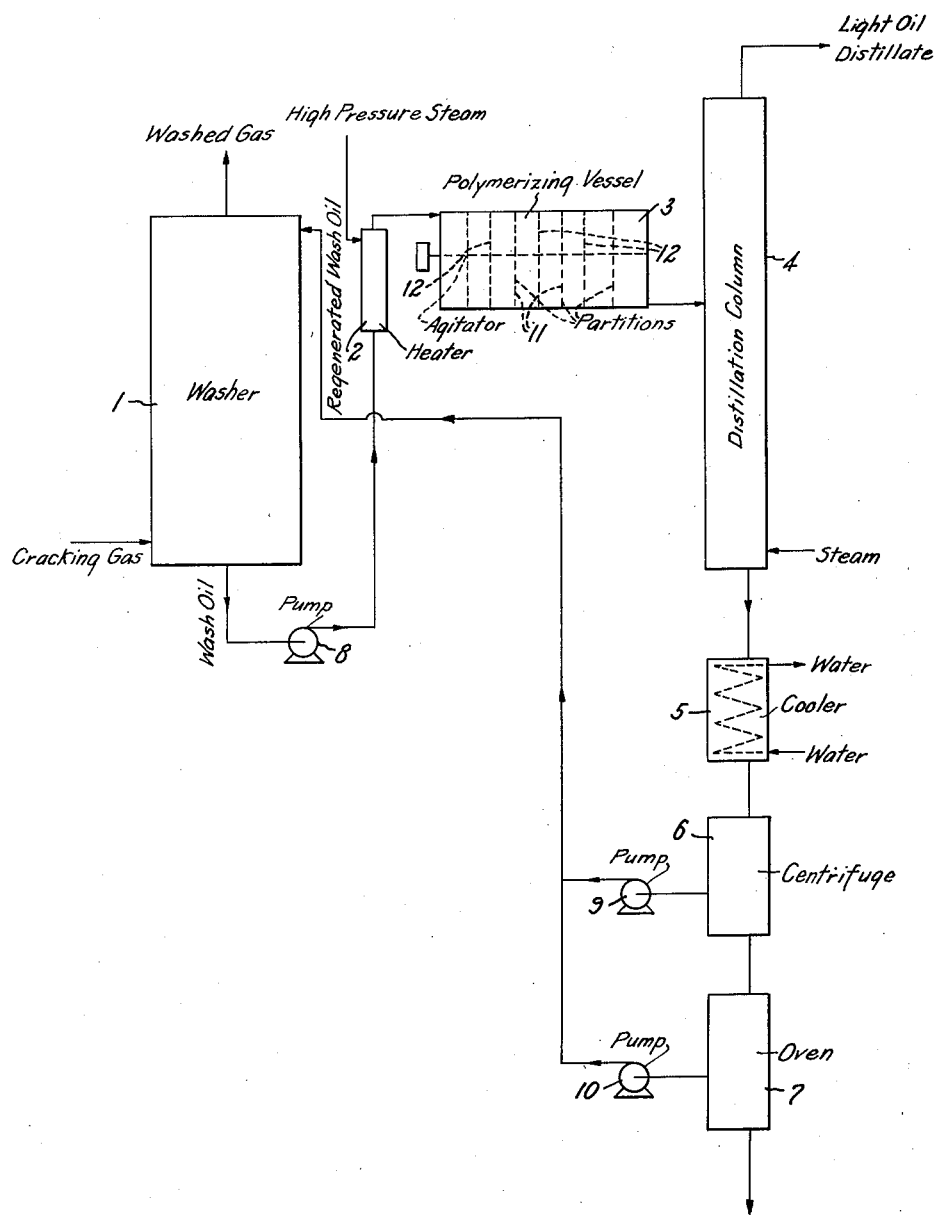

---

2,764,524

PROCESS FOR THE RECOVERY OF LIGHT OIL FROM CRACKING GASES

Walter Jahnentz, Kurt Weichert, and Willi Reich I, Marl, Westphalia, Germany, assignors to Chemische Werke Huls Aktiengesellschaft, a corporation of Germany Application August 19, 1952, Serial No. 305,248

Claims priority, application Germany September 18, 1951

5 Claims. (Cl. 196—23)

The gases produced by high temperature cracking of hydrocarbons under acetylene and light oil forming conditions generally contain acetylene, ethylene and higher, highly unsaturated hydrocarbons such as the higher acetylenes as well as saturated hydrocarbons and light oils comprising aromatic compounds. Such gases may be formed by high temperature cracking of hydrocarbons in a variety of ways such as by means of an electric arc, by partial combustion with oxygen, by thermal or catalytic regenerative or recuperative or flowing or boiling bed cracking etc.

The highly unsaturated hydrocarbons have a strong tendency to polymerize and must be separated from the cracking gases before further processing thereof in order to avoid deposition of the polymerization products in and upon the processing apparatus. It has been proposed to wash the cracking gases with oils of an aliphatic character and to recover the absorbed material and regenerate the washing oil by distillation. It has been proposed further to regenerate the washing oil by treatment with steam and by filtering or centrifuging to free the oil from solid substances. In all of these prior processes it is necessary to purify the circulating wash oil occasionally by distillation. It is unavoidable in such prior processes that the apparatus employed becomes contaminated and that the recovered light oil contains unsaturated compounds and is difficult to handle.

We have found that light oil which has been separated from cracking gases by washing with a wash oil of aliphatic or cyclo aliphatic nature can be recovered without the above mentioned difficulties and disadvantages if the wash oil solution is subjected to a heat treatment to polymerize the highly unsaturated hydrocarbons and thereafter treated to separate solids therefrom and distilled to separate the light oil from the wash oil either before or after the separation of the solids.

The process advantageously is carried out in a system of apparatus in which the cracking gas is washed with wash oil and discharged for further treatment for the recovery of its other valuable components. The wash oil charged with light oil and polymerizable compounds is then passed through a preheater, preferably at a high velocity of at least 1 meter per second to avoid deposition of solids therein and then to a reaction chamber in which the polymerization is effected. The oil then flows to a distillation column in which the light oil is separated by steam distillation and then successively to a cooler and a centrifuge from which the wash oil is returned to the gas washing step. The solids separated in the centrifuge are further treated, as by heating, to recover more wash oil therefrom and the resulting solid residue or coke discharged to waste or for further treatment.

Apparatus suitable for carrying out the process is diagramamtically illustrated in the accompanying drawing.

Referring to the drawing 1 is the washer having an inlet for cracking gases to be washed, an outlet for washed gas, an outlet for wash oil charged with material absorbed from the cracking gases and an inlet for the return of regenerated wash oil, 2 is a heater having an inlet for high pressure steam, 3 is a container in which the polymerization of the polymerizable materials in the wash oil takes place, 4 is the distillation column, 5 is a cooler, 6 is a centrifuge, 7 is an oven or furnace and 8, 9 and 10 are fluid pumps. The container 3 suitably is a horizontally disposed heat insulated cylinder divided by partitions 11 into a plurality, e. g. five, chambers and is provided with an agitator 12 which serves to prevent the settling of solids. The wash oil after the polymerization is introduced adjacent the middle of the distillation column 4 which is provided with a steam inlet near its bottom, an outlet for light oil distillate near its top and an outlet at its lower end for distillation residue i. e. wash oil carrying suspended solids. The distillation may be carried out at atmospheric, superatmospheric or subatmospheric pressure. The cooler 5 has an inlet and an outlet for cooling water. The furnace or oven 7 suitably is a low temperature gas fired furnace.

In the operation of the process, the wash oil carrying polymerized components in solid form as it is discharged from the distillation column may be freed of solids by any suitable method such as centrifuging as illustrated or by filtering or settling and this treatment may be carried out while the oil is hot or after partial or complete direct or indirect cooling. Direct cooling by contact with water is not expedient because in the final separation of wash oil from solid residue in the furnace 7 it is desirable to have a water free material. The residue delivered to the furnace 7 from the centrifuge 6 contains a considerable amount of wash oil which may be recovered by low temperature distillation.

The invention is illustrated by the following specific examples:

Example 1

Cracking gas produced by electric arc cracking is delivered to the washer at the rate 500 m.$^3$ per hour where it is washed with 750 liters of an aliphatic diesel fuel ail having an anilin point of 65° and a boiling range of 220–290° C. The wash oil containing about 3.3 grams/m.$^3$ of polymerizable compounds is passed through the preheater at a velocity of about 1 meter per second. In the polymerizing vessel the oil is held for about ½ hour at about 180° C. preferably under pressure to prevent loss of light oil by vaporization or the polymerization vessel may be provided with a reflux condenser. The time and temperature in the polymerization vessel may be varied, if necessary, in order to effect the desired completeness of the polymerization. The oil is then delivered into the distillation column where the light oil is distilled out with steam at a rate of about 5 liters per hour and is practically free of polymerizable material. The distillation residue of wash oil and polymerization products is then water cooled but without contact with the water and is then delivered to the centrifuge from which wash oil, free of solids, is returned to the washing tower. The so purified wash oil contains only about 0.1 gram/liter of unsaturated compounds. The material separated in the centrifuge at the rate of about 5 kg./hr. is about 50% wash oil. This material is subjected in a layer about 1 cm. thick to low temperature distillation whereby wash oil is recovered at the rate of about 2.5 liters per hour and returned to the washing tower and a low temperature coke is produced at the rate of 2.5 kg./hr. The light oil produced has a boiling range of from 60 to 225° C. and contains about 0.1 gram per liter of unsaturated compounds.

Example 2

Cracking gas produced by the electric arc process is washed with a washing oil having a boiling range of 220–280° C. until about 10 grams of material has been absorbed per liter of oil. The solution is heated for 1 hour at about 150° C. under reflux and then filtered and the residue of unsaturated compounds in the oil determined. The filtered out solids are distilled and then washed free of oil and dried and weighed. The relationship of the washing effect of the different wash oils to the unsaturated compounds in grams per cubic meter of cracking gas (II), the bulk weight of the solids in grams per 100 cubic centimeter (IV), the filterability (V), the weight of unsaturated compounds in the regenerated wash oil in grams per liter (III) and the anilin point of the wash oil (I) is shown in the following table:

|   | I | II | III | IV | V |
|---|---|---|---|---|---|
|   | Degrees |   |   |   |   |
| 1. Synthetic hydrocarbon mixture (Kogasin). | 85 | 0.09 | 0.1 | 7.0 | good. |
| 2. The same plus 10% tar oil | 82 | 0.14 | 0.1 | 13.0 | Do. |
| 3. The same plus 20% tar oil | 75 | 0.20 | 0.14 | 15.8 | Do. |
| 4. The same plus 30% tar oil | 69 | 0.28 | 0.28 | 18.5 | Do. |
| 5. Hydrogenated tar oil | 34 | 0.45 | 1.0 | 26.2 | Do. |
| 6. Diesel oil | 5 | 0.60 | 1.8 | 34.2 | Notably poorer. |

*Example 3*

A hydrocarbon mixture (wash oil) produced by the hydrogenation of carbon monoxide and having a boiling range of 220–280° C. was contacted with a cracking gas produced by the electric arc process until it absorbed 9.5 gm./l. of unsaturated compounds. A part of the resulting solution was distilled with steam yielding 2.1% of light oil containing 52 gm./l. of unsaturated compounds. By fractionating this light oil there is left, after distillation of only a small part of the volatile portion (20%), a pulpy mass which cannot be further processed. If however one heats the wash oil solution for ½ hour at 180° C. under reflux, the light oil can be readily separated by distillation. Thus 1.9% of light oil is produced which contains only 0.1 g./l. of unsaturated compounds and is easily fractionated.

A special advantage of the present process is that distillation of the wash oil which heretofore has been considered to be unavoidable is avoided. This results in a substantial heat saving and further makes it possible to use wash oils having a high boiling point (above 300° C.) which heretofore was objectionable due to the high temperatures required and the fire danger involved in their distillation. The present process gives a better yield and less losses of the light oil product.

In the present process all sorts of wash oils may be used i. e. oils of both aliphatic and cyclo aliphatic composition, both natural and synthetic e. g. gas oil, Fischer-Tropsch oil and mixtures thereof with aromatic wash oils. The preferred wash oils have an anilin point (see Berl-Lunge, Chemisch-technische Untersuchungsmethoden, Bd. vol. III, pages 739, 1933) above 0°, for example from 40° to 70°. It has been found that as the anilin point decreases the washing efficiency of the oil and the bulk weight of the solids produced increases. With increasing bulk weight of the solids however, the filterability of the wash oil decreases. With decreasing anilin point of the wash oil the solid products formed become increasingly heavy so that longer times and higher temperatures are required in the polymerizing step.

We claim:

1. Process for the production of light oil from acetylenic hydrocarbons-containing gaseous products resulting from the high temperature vapor-phase cracking of hydrocarbons under acetylene and light oil forming conditions, which comprises contacting said gaseous products with a hydrocarbon wash oil, subjecting the resulting wash oil solution in the absence of water to a heat treatment of at least about 150° C. to polymerize said acetylenic hydrocarbons therein and thereafter separating light oil and solid polymers from the wash oil.

2. Process for the production of light oil from acetylenic hydrocarbons-containing gaseous products resulting from the high temperature vapor-phase cracking of hydrocarbons under acetylene and light oil forming conditions, which comprises contacting said gaseous products with a wash oil of the group consisting of aliphatic and cycloaliphatic hydrocarbons, subjecting the resulting wash oil solution in the absence of water to a heat treatment of at least about 150° C. to polymerize said acetylenic hydrocarbons therein and thereafter separating the wash oil from the light oil and the solid polymerization products.

3. Process as defined in claim 1 in which the hydrocarbon wash oil has an anilin point of from about 40° to about 70°.

4. Process as defined in claim 2 in which the wash oil containing light oil and polymerization products is subjected to steam distillation to separate the light oil therefrom and thereafter is subjected to treatment for the separation of wash oil in liquid state from the solids suspended therein.

5. Process as defined in claim 4 in which the solid polymerization products are first separated from the wash oil solution of light oil and said solution is then distilled to recover the light oil.

References Cited in the file of this patent

UNITED STATES PATENTS

| 1,215,732 | Snelling | Feb. 13, 1917 |
| 1,592,329 | Black et al. | July 13, 1926 |
| 2,002,902 | Martin et al. | May 28, 1935 |
| 2,409,781 | Mertz | Oct. 22, 1946 |
| 2,418,988 | Segur | Apr. 15, 1947 |
| 2,630,403 | Miller | Mar. 3, 1953 |

FOREIGN PATENTS

| 369,300 | Germany | Feb. 17, 1923 |
| 421,909 | Germany | Nov. 20, 1925 |
| 430,974 | Germany | June 25, 1926 |